United States Patent
Singhal et al.

(10) Patent No.: US 10,063,423 B2
(45) Date of Patent: Aug. 28, 2018

(54) ACCESS NETWORK RELATED INFORMATION PROVISIONING SYSTEM, CONTROL APPARATUS, METHOD OF CONTROLLING THE SAME, COMMUNICATIONS TERMINAL, METHOD OF CONTROLLING THE SAME, PROGRAM, AND STORAGE MEDIUM

(71) Applicant: Telefonaktiebolaget LM Ericsson (publ), Stockholm (SE)

(72) Inventors: Sumit Singhal, Karlskrona (SE); Ivo Sedlacek, Hovorcovice (CZ); Angel Navas Cornejo, Leganes (ES); Sandeep Akhouri, New Delhi (IN)

(73) Assignee: TELEFONAKTIEBOLAGET LM ERICSSON (PUBL) Stockholm (SE)

(*) Notice: Subject to any disclaimer, the term of this patent is extended or adjusted under 35 U.S.C. 154(b) by 218 days.

(21) Appl. No.: 15/102,364

(22) PCT Filed: Dec. 20, 2013

(86) PCT No.: PCT/SE2013/051591
§ 371 (c)(1),
(2) Date: Jun. 7, 2016

(87) PCT Pub. No.: WO2015/094061
PCT Pub. Date: Jun. 25, 2015

(65) Prior Publication Data
US 2017/0026247 A1 Jan. 26, 2017

(51) Int. Cl.
*H04L 12/28* (2006.01)
*H04L 12/56* (2006.01)
(Continued)

(52) U.S. Cl.
CPC ............. *H04L 41/12* (2013.01); *H04W 48/14* (2013.01); *H04W 48/16* (2013.01)

(58) Field of Classification Search
CPC ........ H04L 41/12; H04W 48/14; H04W 48/16
(Continued)

(56) References Cited

U.S. PATENT DOCUMENTS

2013/0012182 A1* 1/2013 Liao ...................... H04W 48/16
455/418
2013/0170351 A1* 7/2013 Reznik .................... H04L 41/12
370/235
(Continued)

FOREIGN PATENT DOCUMENTS

WO WO 2011/038771 A1 4/2011
WO WO 2013/003564 A1 1/2013

OTHER PUBLICATIONS

International Search Report, Application No. PCT/SE2013/051591, dated Aug. 28, 2014.
(Continued)

*Primary Examiner* — Chuong T Ho
(74) *Attorney, Agent, or Firm* — Sage Patent Group (57) ABSTRACT

A control apparatus initiates, in response to a predetermined condition being satisfied, a provisioning, to a communications terminal, of information of a portion of a management object. The control apparatus generates, and transmits to the communications terminal, one or more commands comprising information of the portion including information of a reference node which is a leaf node of the management object and which contains reference information specifying a sub-tree comprising specific access network related information. The communications terminal receives the one or more commands, stores the information of the portion comprised in the one or more commands in accordance with the one or more commands, and acquires the specific access
(Continued)

network related information of the sub-tree using the reference information of the reference node included in the information of the portion.

8 Claims, 10 Drawing Sheets

(51) Int. Cl.
*H04L 12/24* (2006.01)
*H04W 48/14* (2009.01)
*H04W 48/16* (2009.01)

(58) Field of Classification Search
USPC ....... 370/329, 330, 352, 353, 401, 389, 390, 370/392
See application file for complete search history.

(56) References Cited

U.S. PATENT DOCUMENTS

| | | | | |
|---|---|---|---|---|
| 2013/0288668 A1* | 10/2013 | Pragada | ................. | H04W 12/06 455/426.1 |
| 2014/0287746 A1* | 9/2014 | Faccin | ................. | H04W 48/18 455/433 |
| 2014/0295913 A1* | 10/2014 | Gupta | ................... | H04W 74/02 455/552.1 |
| 2017/0078101 A1* | 3/2017 | Maximov | ............... | H04L 9/006 |
| 2017/0093579 A1* | 3/2017 | Maximov | ............. | H04L 9/3242 |
| 2017/0104598 A1* | 4/2017 | Maximov | ............. | H04L 9/3242 |
| 2017/0187532 A1* | 6/2017 | Maximov | ............. | H04L 9/3218 |
| 2017/0374611 A1* | 12/2017 | Pragada | .................. | H04L 69/24 |

OTHER PUBLICATIONS

Written Opinion of the International Searching Authority, Application No. PCT/SE2013/051591, dated Aug. 28, 2014.

3GPP, Technical Specification—"3rd Generation Partnership Project; Technical Specification Group Services and System Aspects; Architecture enhancements for non-3GPP accesses (Release 12)", 3GPP TS 23.402 V12.2.0 (Sep. 2013), 256 pp.

3GPP, Technical Specification—"3rd Generation Partnership Project; Technical Specification Group Services and System Aspects; Architecture enhancements for non-3GPP accesses (Release 12)", 3GPP TS 23.402 V12.3.0 (Dec. 2013), 288 pp.

3GPP, Technical Report—"3rd Generation Partnership Project; Technical Specification Group Services and System Aspects; Study on Wireless Local Area Network (WLAN) network selection for 3GPP terminals; Stage 2 (Release 12)", 3GPP TR 23.865 V12.1.0 (Dec. 2013), 45 pp.

3GPP, Technical Specification—"3rd Generation Partnership Project; Technical Specification Group Core Network and Terminals; Access to the 3GPP Evolved Packet Core (EPC) via non-3GPP access networks; Stage 3 (Release 12)", 3GPP TS 24.302 V12.2.0 (Sep. 2013), 69 pp.

3GPP, Technical Specification—"3rd Generation Partnership Project; Technical Specification Group Core Network and Terminals; Access Network Discovery and Selection Function (ANDSF) Management Object (MO) (Release 12)", 3GPP TS 24.312 V12.2.0 (Sep. 2013), 174 pp.

* cited by examiner

```
<Add>
 <CmdID>4</CmdID>
 <Item>
  <Target>
   <LocURI>./ANDSF/ISRP/ISRP1/ForFlowBased/IFOM_2/
   RoutingCriteria/Time&Location/ValidityArea/ValidityAreaRef</LocURI>
  </Target>
  <Meta>
   <Format xmlns='syncml:metinf'>chr</Format>
   <Type xmlns='syncml:metinf'>text/plain</Type>
  </Meta>
  <Data>./ANDSF/ValidityArea</Data>
 </Item>
</Add>
```

ACCESS NETWORK RELATED INFORMATION PROVISIONING SYSTEM, CONTROL APPARATUS, METHOD OF CONTROLLING THE SAME, COMMUNICATIONS TERMINAL, METHOD OF CONTROLLING THE SAME, PROGRAM, AND STORAGE MEDIUM

CROSS REFERENCE TO RELATED APPLICATION

This application is a 35 U.S.C. § 371 national stage application of PCT International Application No. PCT/SE2013/051591, filed on Dec. 20, 2013, the disclosure and content of which is incorporated by reference herein in its entirety. The above-referenced PCT International Application was published in the English language as International Publication No. WO 2015/094061 A1 on Jun. 25, 2015.

TECHNICAL FIELD

The present invention generally relates to an access network related information provisioning system, a control apparatus, a communications terminal, a method of controlling a control apparatus, a method of controlling a communications terminal, a program, and a storage medium.

BACKGROUND

The number of communications terminals capable of accessing non-3GPP access networks for technologies such as Wireless Local Area Network (WLAN) or Worldwide Interoperability for Microwave Access (WiMAX), in addition to 3GPP access networks, continues to increase. Such communications terminals may be able to automatically select a particular access network based on information such as user settings, operator policy and network conditions, for example.

In an effort to standardize the behavior of such terminals and address new issues related to the integration of non-3GPP access technologies and 3GPP access technologies, new functionality known as Access Network Discovery and Selection Function (ANDSF) has been introduced by the 3GPP in Release 8. The ANDSF is an entity within an Evolved Packet Core (EPC) of the System Architecture Evolution (SAE) for 3GPP compliant mobile networks.

ANDSF provides communications terminals (also known as user equipment) with access network related information in order to control access to access networks. This provisioning may assist the communications terminals in performing access network discovery or access network selection, for example. There are currently four main types of access network related information that an ANDSF control apparatus may provision to a communications terminal:

Inter-System Mobility Policy (ISMP)

ISMP information is a set of operator-defined rules and preferences based upon which a communications terminal may make inter-system mobility decisions. Communications terminals use the inter-system mobility policies when capable of routing IP traffic only over a single radio access interface at a given time.

Access Network Discovery Information

Access network discovery information may include a list of access networks available in the vicinity of the communications terminal. These may be limited to those of a particular access technology types (e.g. WLAN, WiMAX, etc.) requested by the communications terminal.

Inter-System Routing Policy (ISRP)

ISRP information may include a list of policies provided in order to meet operator routing/offload preferences on distribution of traffic of a UE (communications terminal) for transmission over access networks used by the UE. Communications terminals use the inter-system routing policies when capable of routing IP traffic simultaneously over multiple radio access interfaces.

Inter-APN Routing Policy (IARP)

IARP information may include validity conditions, filter rules, priorities and the like for Inter-APN routing.

For details of the functionality of the ANDSF, see the 3GPP specifications TS 23.402 V12.2.0 (especially chapter 4.8.2.1) and TS 24.302 V12.2.0 (especially chapter 6.8 and Annex A.2).

Access network related information is transferred between the communications terminals and the ANDSF using Open Mobile Alliance (OMA) Device Management (DM) as defined in OMA-ERELD-DM-V1_2 (chapter 5 lists the specification baseline of OMA DM device description Baseline) with an ANDSF Management Object (MO) as specified in the 3GPP specification TS 24.312 V12.2.0. The ANDSF MO is a hierarchical tree of nodes used to describe above described access network related information stored in a communications terminal. A portion of the ANDSF MO may be provided to the communications terminal, possibly based upon information such as the current location of the communications terminal, for example.

However, the current technique for providing access network related information is space inefficient and requires large amounts of memory for storage of the information. As the size of the ANDSF MO increases, ever growing network payloads are required for the transmission of the access network related information between the ANDSF control apparatus and communications terminals. Therefore, there is a need for techniques to make the provisioning of access network related information more efficient.

SUMMARY

The present invention was conceived in view of the above circumstances, and it is an object thereof to provide a technique for the more efficient provisioning of access network related information between a control apparatus and a communications terminal.

According to the first aspect of the present invention, there is provided an access network related information provisioning system. The system comprises a communications terminal and a control apparatus operable to provide information of a management object, which is a hierarchical tree comprising access network related information, to the communications terminal to control access to access networks. The control apparatus comprises an initiation unit configured to initiate, in response to a predetermined condition being satisfied, a provisioning, to the communications terminal, of information of a portion of the management object. It also comprises a generation unit configured to generate one or more commands comprising information of the portion including information of a reference node which is a leaf node of the management object and which contains reference information specifying a sub-tree comprising specific access network related information. It also comprises a communication unit configured to transmit, to the communications terminal, the one or more commands generated by the generation unit. The communications terminal comprises a communication unit configured to receive the one or more commands transmitted by the communication unit of the control apparatus. It also comprises a storage unit configured to store the information of the portion comprised in the one or more commands in accordance with the one or more commands received by the communication unit. It also comprises an acquisition unit configured to acquire the specific access network related information of the sub-tree using the reference information of the reference node included in the information of the portion stored by the storage unit.

According to the second aspect of the present invention, there is provided a control apparatus operable to provide information of a management object, which is a hierarchical tree comprising access network related information, to a communications terminal to control access to access networks. The control apparatus comprises an initiation unit configured to initiate, in response to a predetermined condition being satisfied, a provisioning, to the communications terminal, of information of a portion of the management object. It also comprises a generation unit configured to generate one or more commands comprising information of the portion including information of a reference node which is a leaf node of the management object and which contains reference information specifying a sub-tree comprising specific access network related information. It also comprises a communication unit (204) configured to transmit, to the communications terminal, the one or more commands generated by the generation unit.

According to the third aspect of the present invention, there is provided a communications terminal operable to receive from a control apparatus information of a management object, which is a hierarchical tree comprising access network related information. The communications terminal comprises a communication unit configured to receive one or more commands transmitted by the control apparatus, the one or more commands comprising information of a portion of the management object, the portion including information of a reference node which is a leaf node of the management object and which contains reference information specifying a sub-tree comprising information of particular access network related information. It also comprises a storage unit configured to store the information of the portion comprised in the one or more commands in accordance with the one or more commands received by the communication unit. It also comprises an acquisition unit configured to acquire information of the sub-tree using the reference information of the reference node included in the information of the portion stored by the storage unit.

According to the fourth aspect of the present invention, there is provided a method of controlling a control apparatus operable to provide information of a management object, which is a hierarchical tree comprising access network related information, to a communications terminal to control access to access networks. The method comprises an initiation step of initiating, in response to a predetermined condition being satisfied, a provisioning, to the communications terminal, of information of a portion of the management object. It also comprises a generation step of generating one or more commands comprising information of the portion including information of a reference node which is a leaf node of the management object and which contains reference information specifying a sub-tree comprising specific access network related information. It also comprises a communication step of transmitting, to the communications terminal, the one or more commands generated in the generation step.

According to the fifth aspect of the present invention, there is provided a method of controlling a communications terminal operable to receive from a control apparatus information of a management object, which is a hierarchical tree comprising access network related information. The method comprises a communication step of receiving one or more commands transmitted by the control apparatus, the one or more commands comprising information of a portion of the management object, the portion including information of a reference node which is a leaf node of the management object and which contains reference information specifying a sub-tree comprising information of particular access network related information. It also comprises storage step of storing the information of the portion comprised in the one or more commands in accordance with the one or more commands received in the communication step. It also comprises an acquisition step of acquiring information of the sub-tree using the reference information of the reference node included in the information of the portion stored in the storage step.

By virtue of the above features, it is possible for access network related information to be provisioned more efficiently between a control apparatus and a communications terminal.

Further features and advantages of the present invention will be apparent from the following description with reference to the accompanying drawings, in which like reference characters designate the same or similar parts throughout the figures thereof.

DETAILED DESCRIPTION

Figure 1:
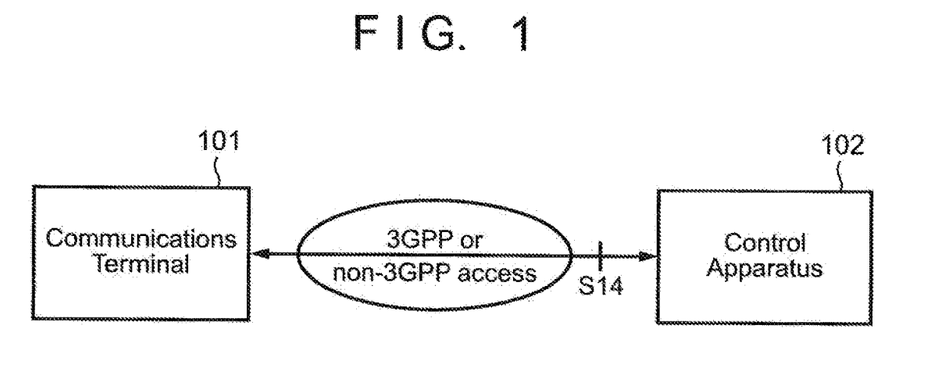
FIG. 1 is a view for showing an overall architecture of an access network related information provisioning system according to some embodiments.

FIG. 1 is a view for showing an overall architecture of an access network related information provisioning system according to some embodiments.

A communications terminal 101 is operable to access to a 3GPP Evolved Packet Core (EPC) via a plurality of access networks. The communications terminal 101 may be capable of accessing via one or more types of non-3GPP access networks for technologies such as WLAN, WiMAX, cdma2000 (registered trademark) High Rate Packet Data (HRPD), and the like.

The communications terminal 101 may also be capable of accessing the EPC via 3GPP access networks. Embodiments are not limited to any particular type of 3GPP access network. The communications terminal 101 may access to a Universal Mobile Telecommunications System Terrestrial Radio Access Network (UTRAN), a Global system for mobile communications Enhanced data rates for GSM evolution Radio Access Network (GERAN) or an Evolved UMTS Terrestrial Radio Access Network (E-UTRAN), for example.

It should be easily recognized that in embodiments there could be many of the communications terminal 101 connected to the 3GPP EPC simultaneously. Also the communications terminal 101 may be any kind of device operable to connect to an access network, such as a smart phone, a laptop or a tablet, for example.

A control apparatus 102 is a network entity operable to control access by the communications terminal 101 to access networks. Explanation will be given for embodiments in which the control apparatus 102 is an ANDSF server. The control apparatus 102 may be located in a home Public Land Mobile Network (PLMN) of the communications terminal 101, or in a visited PLMN, in a case of roaming, for example.

The control apparatus 102 will be explained as a single apparatus, but it should be recognized that in some embodiments the functionality of the control apparatus 102 will be spread across multiple devices. The control apparatus 102 may contain data management and control functionality for the provision of network discovery or selection assistance data according to the policy of the operator.

The communications terminal 101 is capable of connecting, in accordance with a policy of an operator, to the control apparatus 102 via a 3GPP or a non-3GPP access network. The control apparatus 102 may communicate with the communications terminal 101 over the S14 reference point.

Portions of a management object (exemplary explanation will be given for cases where this is an ANDSF MO) which describes access network related information are transmitted between the communications terminal 101 and the control apparatus 102 using OMA DM. Embodiments advantageously reduce a network payload required for such transmissions by replacing duplicate sub-trees of the management object with reference nodes, as will be described in detail with reference to FIG. 5A, FIG. 5B, and FIG. 5C. In addition, storage requirements for information of the management object can be reduced by embodiments.

Figure 2:
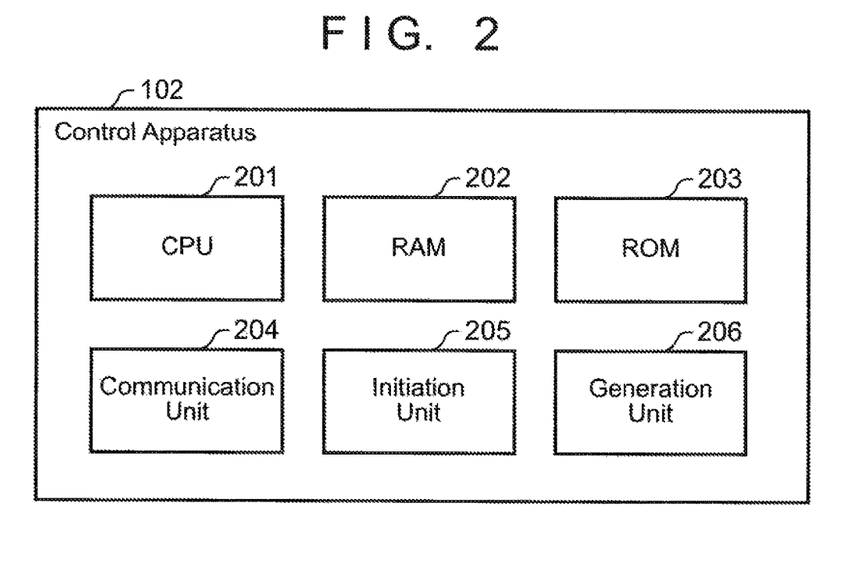
FIG. 2 is a functional block diagram of a control apparatus according to some embodiments.

FIG. 2 is a functional block diagram of the control apparatus 102 according to some embodiments.

Here, the control apparatus 102 comprises a central processing unit (CPU) 201, a random access memory (RAM) 202, a read-only memory (ROM) 203, a communication unit 204, an initiation unit 205, and a generation unit 206. Note that there may be multiple instances of a component. The components may be connected by a bus, and capable of communication with each other thereupon.

The communication unit 204 may include wired links, such as an Ethernet cable for example. It may include wireless links, via transmitting/receiving antennas for example. It is capable of communication with external devices over one or more networks.

In some embodiments, the functionality of the units 205 and 206 is implemented by the CPU 201 executing a software program stored in the ROM 203 using the RAM 202 as a work area. In other embodiments, the units 205 and 206 are implemented using dedicated hardware. In still other embodiments, the units 205 and 206 are implemented using a combination of software and hardware. The detailed operation of the units 205 and 206 will be described later with reference to FIG. 8.

Figure 3:
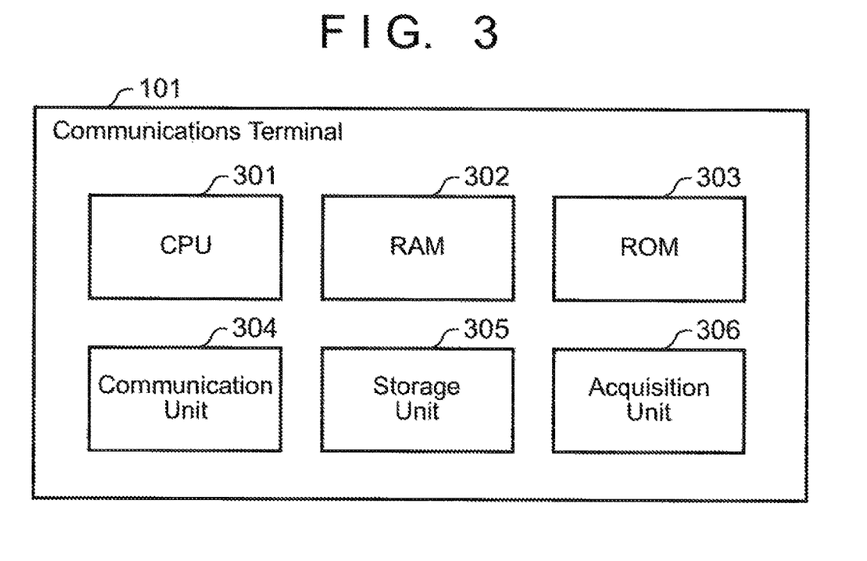
FIG. 3 is a functional block diagram of a communications terminal according to some embodiments.

FIG. 3 is a functional block diagram of the communications terminal 101 according to some embodiments.

Here, the communications terminal 101 comprises a central processing unit (CPU) 301, a random access memory (RAM) 302, a read-only memory (ROM) 303, a communication unit 304, a storage unit 305, and an acquisition unit 306. Note that there may be multiple instances of a component. The components may be connected by a bus, and capable of communication with each other thereupon.

The communication unit 304 may include wired links, such as an Ethernet cable for example. It may include wireless links, via transmitting/receiving antennas for example. It is capable of communication with external devices over one or more networks.

In some embodiments the storage unit 305 is implemented as a built-in, non-volatile memory, such as a flash memory, for example. In other embodiments, however, different types of memory may be used, and in at least one embodiment the storage unit 305 could be implemented as a part of the RAM 302.

In some embodiments, the functionality of the acquisition unit 306 is implemented by the CPU 301 executing a software program stored in the ROM 303 using the RAM 302 as a work area. In other embodiments, the acquisition unit 306 is implemented using dedicated hardware. In still other embodiments, the acquisition unit 306 is implemented using a combination of software and hardware. The detailed operation of the acquisition unit 306 will be described later with reference to FIG. 9.

Figure 4:
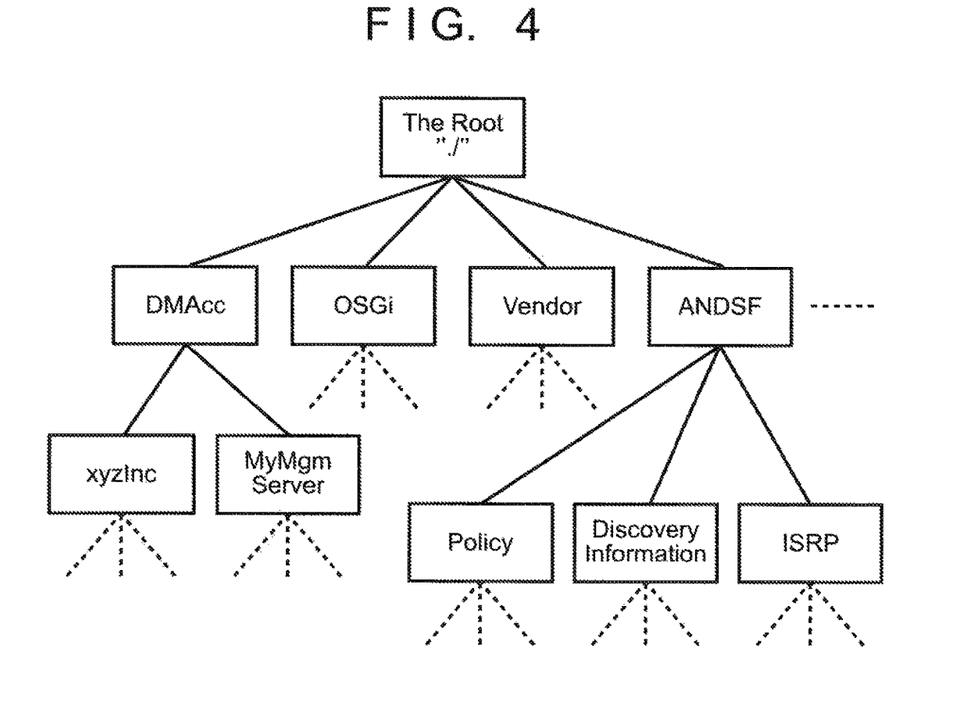
FIG. 4 is a view showing an example of a management tree containing an ANDSF management object according to some embodiments.

FIG. 4 is a view showing an example of a management tree containing an ANDSF management object according to some embodiments. This tree is an example of a complete management tree of the communications terminal 101 according to some embodiments. Details of sub-trees are abbreviated for ease of explanation.

The management tree may organize available management objects in the communications terminal 101 as a hierarchical tree structure where all nodes can be uniquely addressed with a URI. A URI for a node is constructed by starting at the device root and, as the tree is traversed down to the Node in question, each Node name is appended to the previous ones using "/" as the delimiting character. For example, "./ANDSF/ISRP" is a URI for the ISRP node in the ANDSF management object. Note that the root node of the management tree is called ".".

The nodes shown are only examples, and different embodiments may include different sub-trees. The example shows sub-trees related to an OMA DM Account (DMAcc), the OSGi framework (OSGi), and the Vendor. Directly under the root node of the management tree is a sub-tree rooted by an node labeled ANDSF. This sub-tree represents the ANDSF management object.

The ANDSF node of the example contains sub-trees for ISMP access network related information (the Policy node), access network discovery information (the DiscoveryInformation node), and ISRP access network related information (the ISRP node).

The Policy node represents ISMP and may contain information for one or more ISMP rules. The ISRP node represents ISRP and may contain information for one or more ISRP rules. The ISMP and ISRP rules may have one or more validity conditions used to determine if the rules are valid. The DiscoveryInformation node may include discovery information about access networks that the communications terminal 101 can connect to. In other embodiments, the ANDSF management object may contain a different set of sub-trees than are shown in the example of FIG. 4.

Figure 5A:
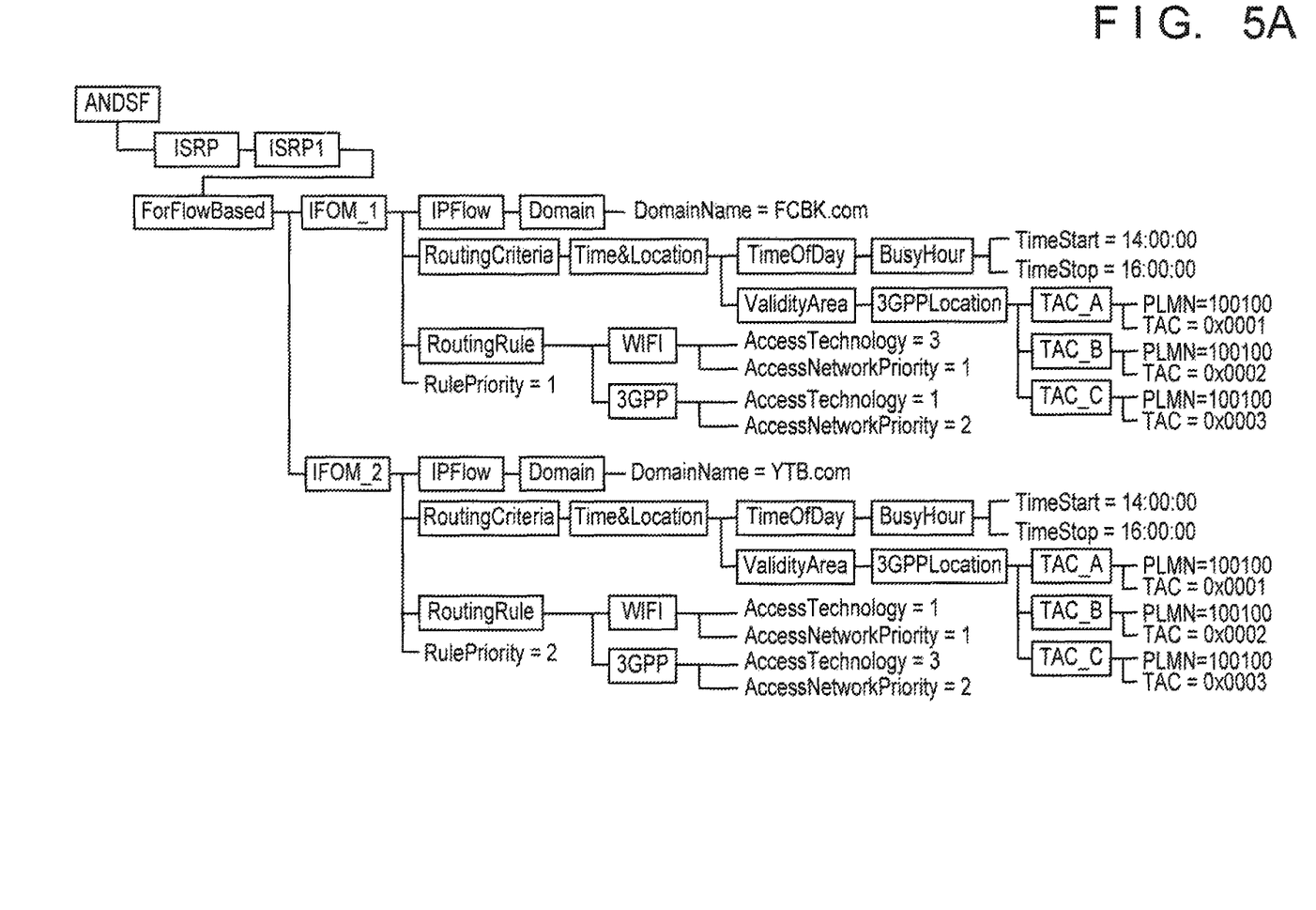
FIG. 5A is a view showing an example of a management object for describing access network related information without the use of reference nodes according to some embodiments.
Figure 5B:
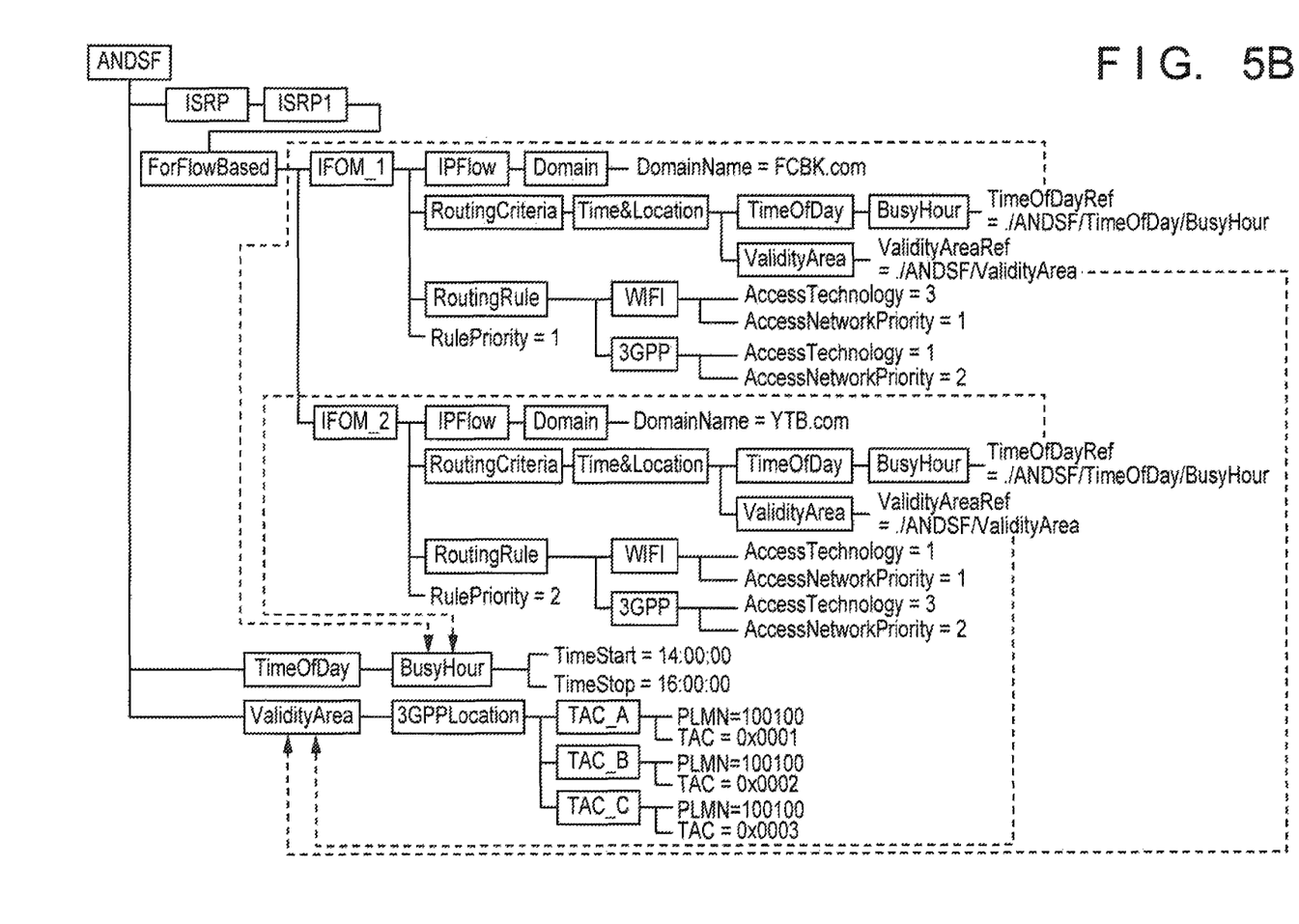
FIG. 5B shows the management object of FIG. 5A improved with reference nodes according to some embodiments.
Figure 5C:
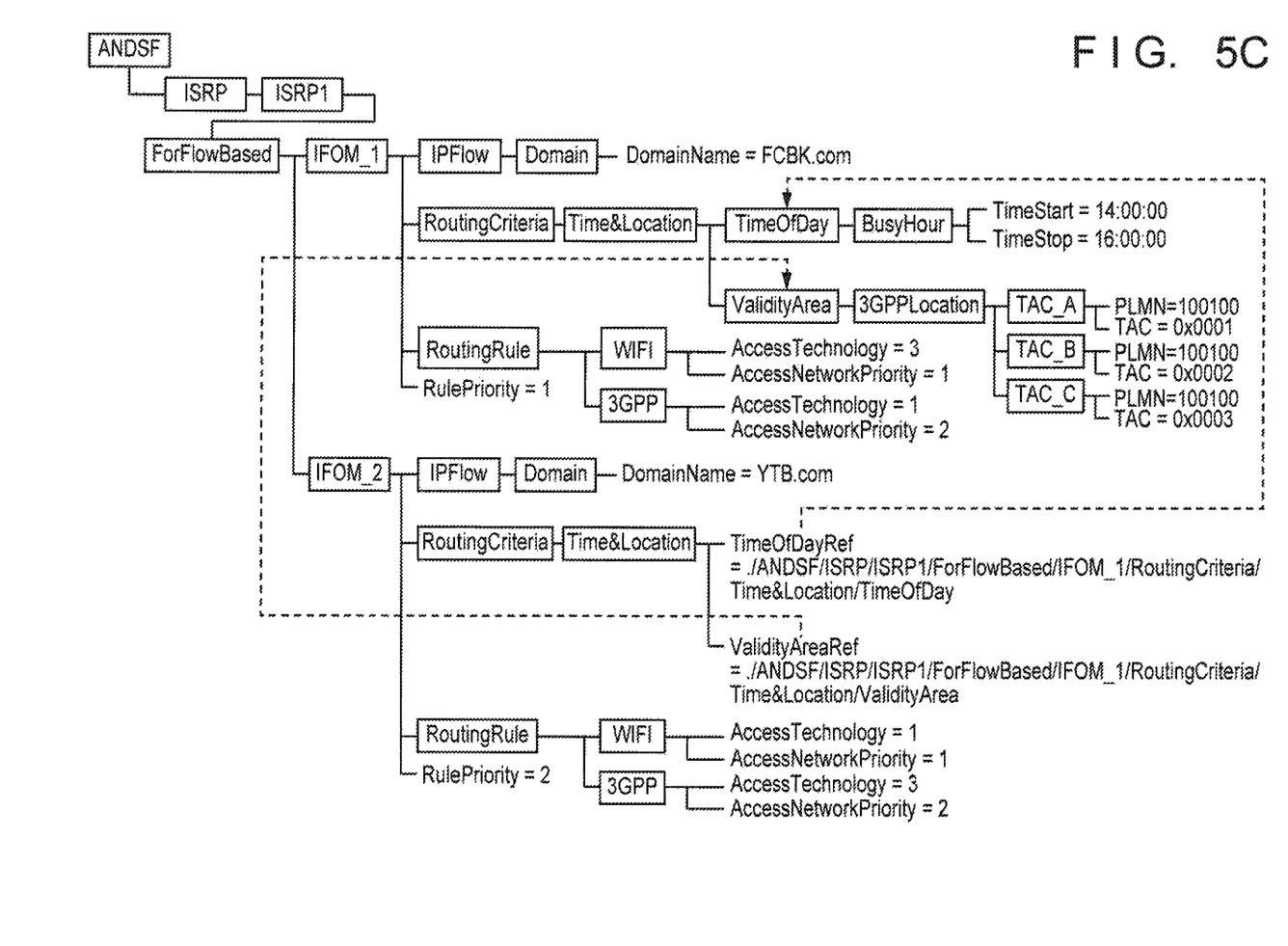
FIG. 5C shows another example of the management object of FIG. 5A improved with reference nodes according to some embodiments.

FIG. 5A, FIG. 5B, and FIG. 5C are views for showing a simplified example of the management object (the ANDSF management object) for describing access network related information, according to some embodiments. This information may be transmitted between the control apparatus 102 and the communications terminal 101. Note that examples of the management object shown in FIG. 5A, FIG. 5B and FIG. 5C may be only one part of a larger management tree, as shown in FIG. 4.

It should be noted that FIG. 5A, FIG. 5B and FIG. 5C exemplify a management object which only contains an ISRP sub-tree, but this is simply for ease of explanation. The management object may contain other sub-trees such as the Policy and DiscoveryInformation sub-trees shown in FIG. 4. The management object may also contain other sub-trees not shown in FIG. 4, such as one for IARP, for example.

FIG. 5A shows the management object without the use of reference nodes. FIG. 5B shows the management object improved with the use of reference nodes. FIG. 5C is another example of the management object of FIG. 5A improved by adding reference nodes according to some embodiments.

Firstly, explanation will be given with reference to FIG. 5A. It should be noted that this example shows a simple example of a management object for ease of explanation, and that in some embodiments, there will be many more sub-trees.

The node labeled "ANDSF" is a root node of the management object. Under the root there is a sub-tree for inter-system routing policy (ISRP) which includes two IP Flow Mobility (IFOM) flow distribution rules (IFOM_1 and IFOM_2) in an IFOM flow distribution container (ForFlowBased).

Each of the flow distribution rules in the example of FIG. 5A contain a validity condition (RoutingCriteria) which includes conditions that define when the rule is valid to apply.

In the example, there are time-related conditions (TimeOfDay) which are considered valid when the time of day in the current time zone, as indicated by the communications terminal 101, matches at least one time interval indicated in the sub-trees rooted at the TimeOfDay nodes.

There are also location-related conditions (ValidityArea) which are considered valid when at least one location indicated in the sub-trees rooted at the ValidityArea nodes are a match. For example, the sub-trees of the ValidityArea nodes in the figure contain 3GPP_Location nodes which hold information for 3GPP location descriptions. Note, that other location descriptions such as those for 3GPP2, WiMAX, WLAN and the like may also be included in ValidityArea nodes.

The 3GPP_Location nodes in the example further contain Tracking Area Code (TAC) nodes which hold TAC codes and Public Land Mobile Network (PLMN) nodes which hold PLMN codes. Note that some embodiments will have sub-trees containing types of nodes not discussed in detail here, that may describe validity areas at different levels of granularity, for example.

The information stored in the leaf nodes of the TimeOfDay sub-trees within both the IFOM_1 flow distribution rule and the IFOM_2 flow distribution rule holds identical data. Similarly, the information stored in the leaf nodes of the ValidityArea sub-trees within both the IFOM_1 flow distribution rule and the IFOM_2 flow distribution rule also holds identical data. In other words, multiple copies of the exact same data are stored throughout the management object tree, redundantly.

Next, with reference to FIG. 5B, explanation will be given for an example of the management object of FIG. 5A improved by adding reference nodes according to some embodiments.

As is illustrated in FIG. 5B, specific access network related information which can be referenced from multiple locations in the management object is arranged in sub-trees of the management object. Specifically, to eliminate the duplication of the identical information, the TimeOfDay information and the ValidityArea information is arranged in the sub-trees at the URIs ./ANDSF/TimeOfDay and ./ANDSF/ValidityArea respectively.

Reference nodes are introduced to specify the information arranged in the sub-trees. Specifically, the reference nodes at the URI ./ANDSF/ISRP/ISRP1/ForFlowBased/IFOM_1/RoutingCriteria/Time&Location/TimeOfDay/BusyHour/TimeOfDayRef and the URI ./ANDSF/ISRP/ISRP1/ForFlowBased/IFOM_2/RoutingCriteria/Time&Location/TimeOfDay/BusyHour/TimeOfDayRef reference the same information. Similarly, the reference nodes at the URI ./ANDSF/ISRP/ISRP1/ForFlowBased/IFOM_1/RoutingCriteria/Time&Location/ValidityArea/ValidityAreaRef and the URI ./ANDSF/ISRP/ISRP1/ForFlowBased/IFOM_2/RoutingCriteria/Time&Location/ValidityArea/ValidityAreaRef reference the same information. These reference nodes are leaf nodes of the management object that contain reference information specifying a sub-tree comprising specific access network related information.

In some embodiments, the reference information of a reference node is a uniform resource identifier (URI) specifying a path from a root node to the sub-tree that the reference node specifies. In the example, the reference nodes hold, as their data, the URIs of the sub-trees in the management object that they specify, namely ./ANDSF/TimeOfDay/BusyHour for the TimeOfDayRef reference nodes and ./ANDSF/ValidityArea for the ValidityAreaRef reference nodes.

Note that the URIs given as examples are full paths from the root of the tree to the node that the reference nodes specify. In other embodiments the URIs of the reference nodes are relative URIs. For example, instead of "./ANDSF/ValidityArea", a relative URI may hold the information "ANDSF/ValidityArea".

In some embodiments, a referenced sub-tree is placed directly under the root node of the management object. This is the case in FIG. 5B, where the referenced information is arranged directly under the ANDSF node of the management object. This has an advantage of making the URIs of the nodes in the sub-tree shorter than they might otherwise be. Embodiments so configured may have the advantage of reducing the space required for the URI to be stored and reducing the payload required for the URI to be transmitted.

Also, such embodiments allow for a referencing sub-tree to be deleted, while maintaining the referenced sub-tree information. Because only the referencing sub-tree would be deleted in such cases, a considerable payload reduction may be achieved when later the same referenced sub-tree information is be provisioned since the referenced sub-tree information would not have to be sent again.

In other embodiments the sub-tree containing referenced information may be maintained elsewhere in the management object, or in a sub-tree of a management object other than the management object containing the reference node.

Note, in some embodiments the locations of the reference nodes or the sub-trees that they specify will be different. For example, instead of having the reference node at the location ./ANDSF/ISRP/ISRP1/ForFlowBased/IFOM_2/ Routing Criteria/Time&Location/TimeOfDay/BusyHour/ TimeOfDayRef specifying the sub-tree located at ./ANDSF/ TimeOfDay/BusyHour, other embodiments may have a reference node, similarly named TimeOfDayRef, at the location ./ANDSF/ISRP/ISRP1/ForFlowBased/IFOM_2/ Routing Criteria/Time&Location/TimeOfDayRef specifying the sub-tree located at ./ANDSF/TimeOfDay. Similarly, instead of having the reference node at the location ./ANDSF/ISRP/ISRP1/ForFlowBased/IFOM_2/ Routing Criteria/Time&Location/ValidityArea/ValidityAreaRef specifying the sub-tree located at ./ANDSF/ValidityArea, other embodiments may have a reference node, similarly named ValidityAreaRef, at the location ./ANDSF/ ANDSF/ISRP/ISRP1/ForFlowBased/IFOM_2/RoutingCriteria/Time&Location/ValidityAreaRef specifying the sub-tree located at ./ANDSF/ValidityArea. In still other embodiments reference nodes and referenced sub-trees will be located at other locations in the tree.

While the sub-trees rooted at the interior nodes located at ./ANDSF/TimeOfDay/BusyHour and ./ANDSF/ValidityArea are given as examples of the sub-trees that the reference nodes specify in the example of FIG. 5B, reference nodes may be used to specify sub-trees for other access network related information. For example a reference node may specify a sub-tree for access network related information such as an IPFlow sub-tree indicating the flow description for a particular flow distribution rule, for example.

Also, while the reference nodes are nodes for IFOM flow distribution in the example of FIG. 5B, in some embodiments the reference nodes may be nodes for Multiple-Access PDN Connectivity (MAPCON) flow distribution (ForServiceBased) or for Non-seamless WLAN offload flow distribution (ForNonSeamlessOffload), for example. Furthermore, reference nodes need not be limited to inter-system routing policy (ISRP) sub-trees, and may also be included in inter-system mobility policy (ISMP) sub-trees, or in Inter-APN Routing Policy (IARP) sub-trees, for example.

The introduction of reference nodes eliminates unnecessary redundancies in the management object, reducing storage requirements and network payload requirements in the provision of the access network related information.

Next, with reference to FIG. 5C, explanation will be given for another example of the management object of FIG. 5A improved by adding reference nodes according to some embodiments. In the example of FIG. 5C, reference nodes in the flow distribution rule IFOM_2 specify sub-trees in the flow distribution rule IFOM_1. In other words, the referenced sub-tree is for an access network related rule and the reference node is contained in another sub-tree for an access network related rule.

Specifically, there is a reference node at the location ./ANDSF/ISRP/ISRP1/ForFlowBased/IFOM_2/ Routing Criteria/Time&Location/TimeOfDayRef specifying the sub-tree located at ./ANDSF/ISRP/ISRP1/ForFlowBased/IFOM_1/RoutingCriteria/Time&Location/ TimeOfDay. Similarly, there is a reference node at the location ./ANDSF/ISRP/ISRP1/ForFlowBased/IFOM_2/ Routing Criteria/Time&Location/ValidityAreaRef specifying the sub-tree located at ./ANDSF/ISRP/ISRP1/ForFlowBased/IFOM_1/RoutingCriteria/Time&Location/ ValidityArea.

The example shown in FIG. 5C may be slightly more space efficient than that of FIG. 5B since it require two fewer reference nodes.

Note that while FIG. 5C shows an example in which reference nodes in one ISRP rule specify sub-trees in another ISRP rule, in other embodiments reference nodes may be located in other kinds of access network related rules (for example ISMP rules or IARP rules) and specify sub-trees for other kinds of access network related rules (for example ISMP rules or IARP rules respectively).

Figure 6:
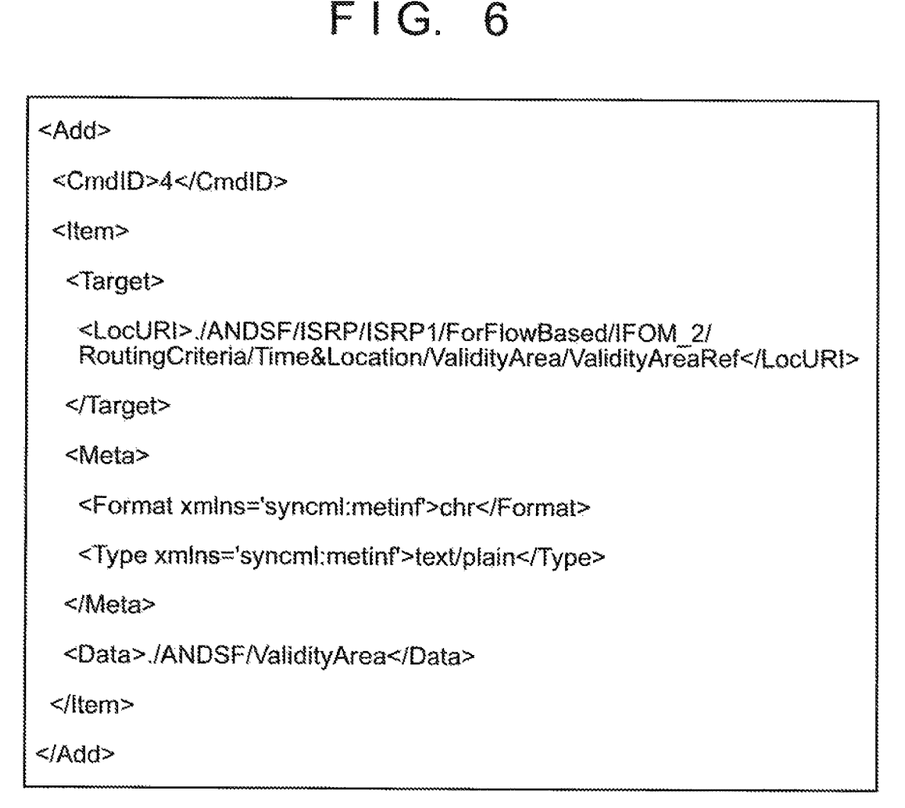
FIG. 6 is an example of a command for providing access network related information from the control apparatus to the communications terminal according to some embodiments.

FIG. 6 is an example of a command for provisioning of access network related information from the control apparatus 102 to the communications terminal 101 according to some embodiments.

The example of FIG. 6 is of an OMA DM Add command, but it should be recognized that embodiments are not limited to this, and any other commands that contain information of a reference node, such as a Replace command, for example, may be adapted.

The command of FIG. 6 adds a new reference node at the location in the tree specified by the LocURI tag (./ANDSF/ ISRP/ISRP1/ForFlowBased/IFOM_2/RoutingCriteria/ Time&Location/ValidityArea/ValidityAreaRef).

The data of the new reference node is specified by the Data tag, and comprises reference information. Specifically, the reference information here is a URI of a sub-tree that the reference node specifies (./ANDSF/ValidityArea).

Figure 7A:
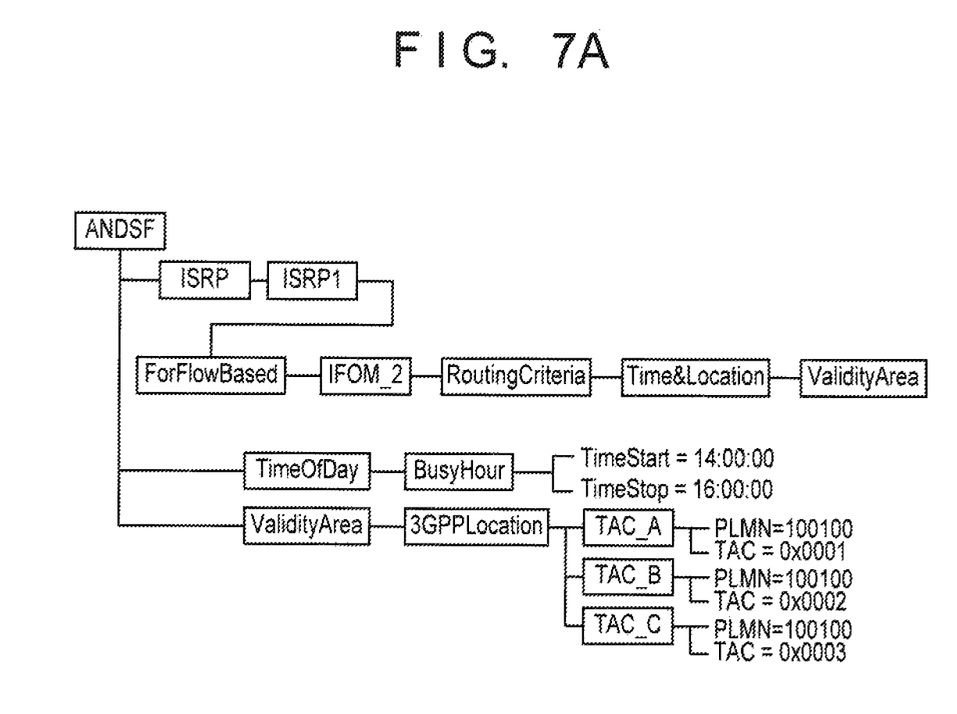
FIG. 7A is a view for showing a fragment of a management object before the command of FIG. 6 is received and processed by the communications terminal according to some embodiments.
Figure 7B:
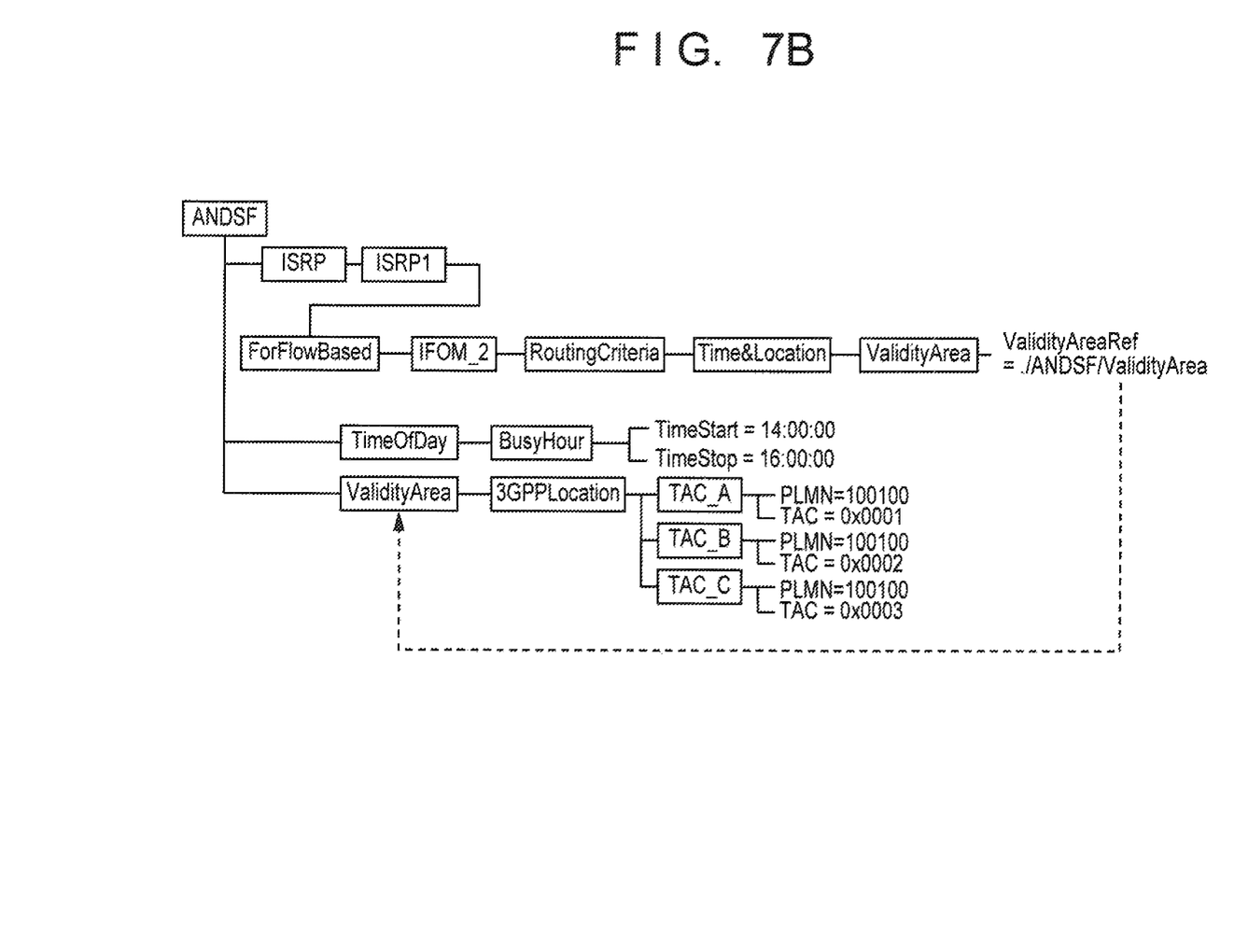
FIG. 7B shows a fragment of the management object after the command of FIG. 6 is received and processed by the communications terminal according to some embodiments.

FIG. 7A and FIG. 7B are views for showing simplified examples of fragments of the management object before and after the exemplary command according to FIG. 6 is transmitted and processed. It should be easily recognized that some embodiments will have many more nodes and sub-trees than these figures show.

FIG. 7A shows a fragment of the management object before the command of FIG. 6 is received and processed by the communications terminal 101. Note that interior node (ValidityArea) at the path specified by the LocURI tag in the command does not have a leaf node attached to it.

FIG. 7B shows a fragment of the management object after the command of FIG. 6 is received and the corresponding reference node (ValidityAreaRef) is stored under the interior node ValidityArea at the location specified by the LocURI tag in the command. Note that the sub-tree that the reference node specifies is located at the URI ./ANDSF/ValidityArea existed at the time of receiving the command.

The control apparatus 102 may generate, and transmit to the communications terminal 101, such a command when provision of access network related information to the communications terminal 101 is initiated by a predetermined condition being satisfied.

The communications terminal 101, having received the command will store the reference information of the reference node, and may later use the reference information to acquire specific access related information that it specifies.

Figure 8:
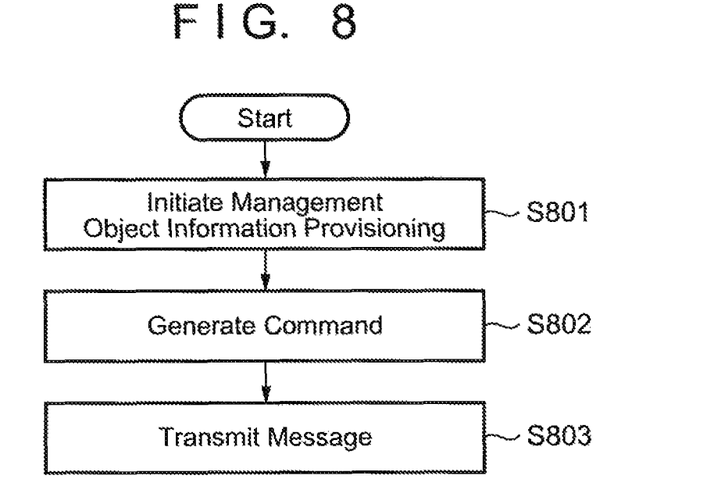
FIG. 8 is a flowchart for describing providing information of the management object to a communications terminal according to some embodiments.

FIG. 8 is a flowchart for describing provisioning of information of the management object to the communications terminal 101 according to some embodiments.

This processing is executed by the control apparatus 102 according to some embodiments.

In step S801, the initiation unit 205 of the control apparatus 102 initiates, in response to a predetermined condition being satisfied, a provisioning (providing) to the communications terminal 101, of information of a portion of the management object. In some embodiments, the predetermined condition here may be that the communications unit 204 of the control apparatus 102 receives a request for provision from the communications terminal 101, for example. This request may be a client-initiated session alert message, in a case of a pull mode operation, for example.

In some embodiments the predetermined condition may be based on network triggers or the result of previous communication with the communications terminal 101, in a case of a push mode operation, for example.

After the initiation unit 205 initiates the provisioning in step S801, the processing proceeds to step S802, and a generation unit 206 generates one or more commands comprising information of the portion of the management object to be provided.

In some embodiments these commands correspond to OMA DM commands. The commands may be for adding, replacing, obtaining, or deleting nodes, for example, or for executing a command on an object within the management object. The information of the portion of the management object comprised in the commands includes information of a reference node, as explained with reference to FIG. 5B.

The reference node is a leaf node of the management object which contains reference information specifying a sub-tree comprising specific access network related information. The reference information of the reference node is included in the information of the reference node included in the above described commands. The specific access network related information may be comprised in a ValidityArea sub-tree, or a TimeOfDay sub-tree, as described above, for example.

The specific access network related information may alternatively be information of any other sub-tree where data may be referenced from within the management object, such as an IPFlow sub-tree, for example.

Furthermore, the sub-tree that the reference node specifies may be included in the information of the portion of the management object that is provided. For example, in some embodiments, the control apparatus 102 may not maintain information about what information has been previously provided to the communications terminal 101. In such a case, the control apparatus may provide not only the reference node, but also the sub-tree that the reference node specifies, even though the communications terminal 101 already maintains the specified sub-tree. Such an implementation may have an advantage in being simpler to implement as the control apparatus 102 may not need to determine what information the communications terminal 101 is currently storing.

However, embodiments are not limited to this, and the specified sub-tree may be separate from the provisioned portion. For example, in some embodiments, the control apparatus 102 may maintain information about what information has already been provisioned to the communications terminal 101. In such a case, the control apparatus 102 may be able to determine that the communications terminal 101 already stores the sub-tree that the reference node specifies, and the sub-tree need not be included in the provisioned portion. This is advantageous in that the amount of information that needs to be transmitted is reduced.

The commands generated by the generation unit 206 in step S802, are transmitted by the communication unit 204, in step S803, to the communications terminal 101. The commands need not all be of the same type, and for example, there may be Add commands, as in the example of FIG. 6, as well as Replace commands, or the like. It should be noted that the commands may all be sent at once or may be sent separately. Also, some commands may be sent before the generation unit 206 has generated all of the commands, for example. The transmission may take place over a 3GPP network, or a non-3GPP network.

Figure 9:
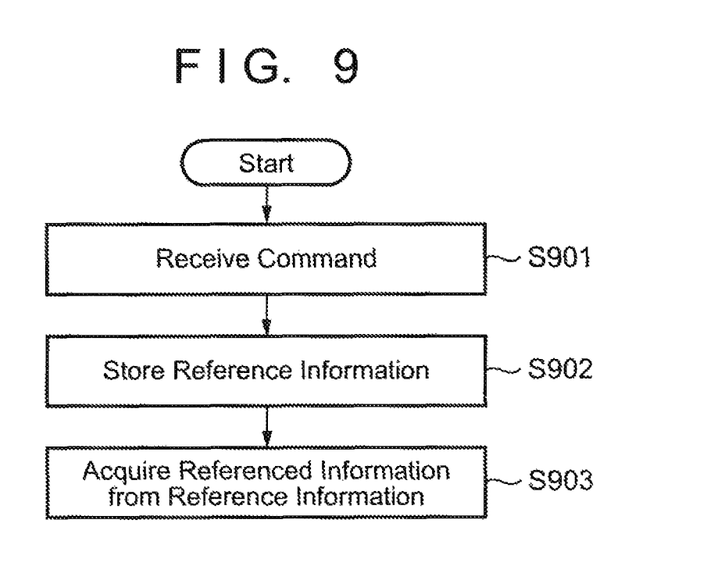
FIG. 9 is a flowchart for describing provisioning of information of the management object to the communications terminal according to some embodiments.

FIG. 9 is a flowchart for describing provisioning of information of the management object to the communications terminal 101 according to some embodiments. This processing is executed by the communications terminal 101 according to some embodiments.

This processing may begin after the communications terminal 101 receives a valid notification (an ANDSF notification SMS for example) from the control apparatus 102 and establishes a secure data connection using the information received in the notification SMS, for example (push model).

In other cases, the processing may be initiated by the communications terminal 101 sending a query to the control apparatus 102 to retrieve or update inter-system policy information (ISMP, ISRP, etc.), for example, or information about available access networks in its vicinity or both (pull model).

In step S901, the communication unit 304 of the communications terminal receives one or more commands transmitted from the control apparatus 102 comprising information of a portion of the management object. Explanation of the details of these commands will be omitted as the explanation would be the same as that given in the description with reference to FIG. 8.

In step S902, the storage unit 305 stores information of the portion comprised in the one or more commands in accordance with the one or more commands received by the communication unit 304. For example, in the case of a command for adding a node, information contained in the commands may be added to information previously stored by the storage unit 305. Because duplicate information can be eliminated by the introduction of reference nodes, the amount of information stored by the storage unit 305 in step S902 can be advantageously reduced.

The information included in the command may be stored in a non-volatile manner. However, embodiments are not limited to this, and in some embodiments, the information of the command may only be stored temporarily, in a volatile manner, and discarded after it is used to acquire the relevant specific access network information.

In step S903, the acquisition unit 306 of the communications terminal 101 acquires information of the sub-tree specified by the reference node. It does so using the reference information of the reference node included in the information of the portion of the management object stored in step S902. This acquired information may be used for access network discovery, for access network selection, or to retrieve information stored by the communications terminal 101 to be transmitted to the control apparatus 102 in service of a Get command, for example.

Consider a case where a portion of the management object corresponding to the IFOM_1 sub-tree as illustrated in FIG. 5B is stored by the storage unit 305. The acquisition unit 306 may acquire specific access network related information of the TimeOfDay sub-tree specified by the reference information of the TimeOfDayRef leaf node as follows. Firstly, the acquisition unit 306 may traverse the management object tree from the ANDSF root node to the TimeOfDayRef leaf node. Then, the acquisition unit 306 may read the reference information stored for the TimeOfDayRef node.

The acquisition unit 306 may then traverse the management object tree from the root to the sub-tree specified by the reference information, following the path described in the URI of the reference information, and acquire the specific access network related information.

As described above, according to the embodiments, a control apparatus 102 is operable to provide information of a management object, which is a hierarchical tree comprising access network related information, to a communications terminal 101 to control access to access networks. The control apparatus 102 initiates, in response to a predetermined condition being satisfied, a provisioning, to the communications terminal, of information of a portion of the management object. The control apparatus 102 generates one or more commands comprising information of the portion including information of a reference node which is a leaf node of the management object and which contains reference information specifying a sub-tree comprising specific access network related information. The control apparatus 102 transmits, to the communications terminal 101, the one or more generated commands.

The communications terminal 101 receives the one or more commands transmitted by the control apparatus 102, and stores the information of the portion comprised in the one or more commands in accordance with the one or more commands received. The communications terminal 101 acquires the specific access network related information of the sub-tree using the reference information of the reference node included in the information of the portion stored.

Accordingly, these embodiments allow access network related information to be stored in a space efficient manner, freeing up memory space for other purposes, and helping to alleviate the costs involved in providing large amounts of memory in the communications terminal 101 or in the control apparatus 102.

Furthermore, the smaller size requirements for the information sent across the network in the provisioning allows for network resources, that would otherwise be required, to be freed up.

The present invention is not limited to the above-described embodiments, and various changes and modifications can be made within the spirit and scope of the present invention. Therefore, to apprise the public of the scope of the present invention, the following claims are made.

The invention claimed is:

1. A control apparatus configured to provide information of a management object, which is a hierarchical tree comprising access network related information, to a communications terminal to control access to access networks, the control apparatus comprising:
   an initiation circuit configured to initiate, in response to a predetermined condition being satisfied, a provisioning, to the communications terminal, of information of a portion of the management object;
   a generation circuit configured to generate one or more commands comprising information of the portion including information of a reference node which is a leaf node of the management object and which contains reference information specifying a sub-tree comprising specific access network related information, wherein the specific access network related information comprised in the sub-tree is a location-related condition or a time-related condition; and
   a communication circuit configured to transmit, to the communications terminal, the one or more commands generated by the generation circuit,
   wherein the sub-tree is a sub-tree of a management object other than the management object containing the reference node, wherein the reference node is contained in another sub-tree for another access network related rule.

2. The control apparatus according to claim 1, wherein the reference node is a node for inter-system mobility policy, for inter-system routing policy or for inter-APN routing policy.

3. The control apparatus according to claim 1, wherein the reference information is a uniform resource identifier (URI) specifying a path from a root node to the sub-tree or specifying a relative path to the sub-tree.

4. The control apparatus according to claim 1, wherein the sub-tree is for an access network related rule.

5. A communications terminal configured to receive from a control apparatus information of a management object, which is a hierarchical tree comprising access network related information, the communications terminal comprising:
   a communication circuit configured to receive one or more commands transmitted by the control apparatus, the one or more commands comprising information of a portion of the management object, the portion including information of a reference node which is a leaf node of the management object and which contains reference information specifying a sub-tree comprising information of particular access network related information, wherein the information of the particular access network related information comprised in the sub-tree comprises a location-related condition or a time-related condition;
   a storage circuit configured to store the information of the portion comprised in the one or more commands in accordance with the one or more commands received by the communication circuit; and
   an acquisition circuit configured to acquire information of the sub-tree using the reference information of the reference node included in the information of the portion stored by the storage circuit,
   wherein the sub-tree is a sub-tree of a management object other than the management object containing the reference node, wherein the reference node is contained in another sub-tree for another access network related rule.

6. The communications terminal according to claim 5, wherein the particular access network related information is for inter-system mobility policy, for inter-system routing policy, or for inter-APN routing policy.

7. The communications terminal according to claim 5, wherein the reference information is a uniform resource identifier (URI) specifying a path from a root node to the sub-tree or specifying a relative path to the sub-tree.

8. The communications terminal according to claim 5, wherein the sub-tree is for an access network related rule.

* * * * *